(12) United States Patent
Chan et al.

(10) Patent No.: US 8,098,459 B2
(45) Date of Patent: Jan. 17, 2012

(54) CONNECTING A PREAMPLIFIER TO A PRINTED CIRCUIT BOARD ASSEMBLY ON A HARD DISK DRIVE

(75) Inventors: Yeow Yong Chan, Singapore (SG);
Hongyan Jiang, Singapore (SG);
Shaoyong Liu, Singapore (SG);
Xiaomin Liu, Singapore (SG)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 590 days.

(21) Appl. No.: 12/324,813

(22) Filed: Nov. 26, 2008

(65) Prior Publication Data

US 2010/0128398 A1 May 27, 2010

(51) Int. Cl.
*G11B 5/55* (2006.01)
(52) U.S. Cl. ...................................... 360/264.2; 200/292
(58) Field of Classification Search ............... 360/264.2; 200/292; 439/751
See application file for complete search history.

(56) References Cited

U.S. PATENT DOCUMENTS

| | | | |
|---|---|---|---|
| 5,760,997 A | 6/1998 | Koyanagi et al. | |
| 5,844,754 A | 12/1998 | Stefansky et al. | |
| 5,910,862 A | 6/1999 | Ogawa et al. | |
| 5,953,183 A * | 9/1999 | Butler et al. | 360/264.2 |
| 6,057,982 A | 5/2000 | Kloeppel | |
| 6,178,056 B1 | 1/2001 | Cloke et al. | |
| 6,270,375 B1 | 8/2001 | Cox et al. | |
| 6,351,343 B1 | 2/2002 | Nakagawa et al. | |
| 6,452,754 B1 | 9/2002 | Mitzuta et al. | |
| 6,472,866 B2 * | 10/2002 | Aslami | 324/210 |
| 6,631,052 B1 * | 10/2003 | Girard et al. | 360/245.8 |
| 6,702,592 B1 * | 3/2004 | Harden et al. | 439/78 |
| 6,809,905 B2 * | 10/2004 | Kilmer | 360/264.2 |
| 6,875,026 B2 | 4/2005 | Lee et al. | |
| 7,291,795 B2 * | 11/2007 | Maharshak et al. | 200/292 |
| 7,377,823 B2 | 5/2008 | Chen | |
| 2002/0006005 A1 | 1/2002 | Akutsu et al. | |
| 2003/0022533 A1 | 1/2003 | Joo | |
| 2003/0142243 A1 | 7/2003 | Lee et al. | |
| 2006/0141816 A1 | 6/2006 | Kitahori et al. | |
| 2006/0180346 A1 | 8/2006 | Knight et al. | |

FOREIGN PATENT DOCUMENTS

| | | |
|---|---|---|
| EP | 0710955 | 5/1999 |
| EP | 0825680 | 3/2001 |
| JP | 08-212728 | 8/1996 |
| JP | 10-003758 | 1/1998 |
| JP | 2000-243076 | 9/2000 |
| JP | 2007-207300 | 8/2007 |

OTHER PUBLICATIONS

Jawaid, Shams et al., "Design Evaluation & Product Reliability Assessment Using Accelerated Reliability Fatigue Life Tests", *Reliability abd Maintainability Symposium* http://ieeexplore.ieee.org/appliation/mdl/mdlconfirmation.jsp?arnumber=816314, (2000),239-244.

* cited by examiner

*Primary Examiner* — Viet Q Nguyen

(57) ABSTRACT

Connecting a preamplifier to a printed circuit board assembly on a hard disk drive. The disk includes a housing, a head stack assembly coupled with the housing, a printed circuit board assembly comprising via holes, a preamplifier coupled with the head stack assembly, and at least one deformable pogo pin configured to mechanically and communicatively connect the printed circuit board assembly to the preamplifier upon insertion into the via holes, further configured to comprise a tip and a shaft, and further configured to deform upon insertion into the via holes.

16 Claims, 4 Drawing Sheets

US 8,098,459 B2

CONNECTING A PREAMPLIFIER TO A PRINTED CIRCUIT BOARD ASSEMBLY ON A HARD DISK DRIVE

BACKGROUND ART

At least one hard disk drive (HDD) is used in almost all computer system operations. In fact, most computing systems are not operational without some type of HDD to store the most basic computing information such as the boot operation, the operating system, the applications, and the like. In general, the HDD is a device which may or may not be removable, but without which the computing system will generally not operate.

The basic HDD model includes a storage disk or hard disk that spins at a designed rotational speed. An actuator arm with a suspended slider is utilized to reach out over the disk. The slider is coupled with a suspension that supports both the body of the slider and a head stack assembly that has a magnetic read/write transducer or head or heads for reading/writing information to or from a location on the disk. Typically connected to the head stack assembly is a preamplifier.

In assembling a hard disk drive, a printed circuit board assembly (hereinafter "PCBA") is often attached to the housing of the hard disk drive. Attaching the PCBA to the housing of the hard disk drive usually results in stress on the PCBA. This stress can warp the PCBA, affect the soldering balls of the PCBA, and ultimately affect the reliability of the hard disk drive.

SUMMARY

A disk drive system comprising deformable pogo pins and via holes is described. The disk drive system includes a housing, a head stack assembly coupled with the housing, a printed circuit board assembly comprising via holes, a preamplifier coupled with the head stack assembly, and at least one deformable pogo pin configured to mechanically and communicatively connect the printed circuit board assembly to the preamplifier upon insertion into the via holes, further configured to comprise a tip and a shaft, and further configured to deform upon insertion into the via holes.

BEST MODES FOR CARRYING OUT THE INVENTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with a discussion of an HDD and components connected therewith. The discussion will then focus on embodiments of a method and system for connecting a preamplifier to a PCBA on a HDD. Embodiments of the present invention are directed to a disk drive including deformable pogo pins attached to a preamplifier and via holes in a PCBA for connecting the PCBA to the preamplifier. Embodiments of the present invention are also directed to a disk drive including an extended flexible printed cable and a zero insertion force connector used to connect the PCBA to the preamplifier. With embodiments of the present invention, stress on the PCBA is reduced and the reliability of the HDD is improved.

Operation

Figure 1:
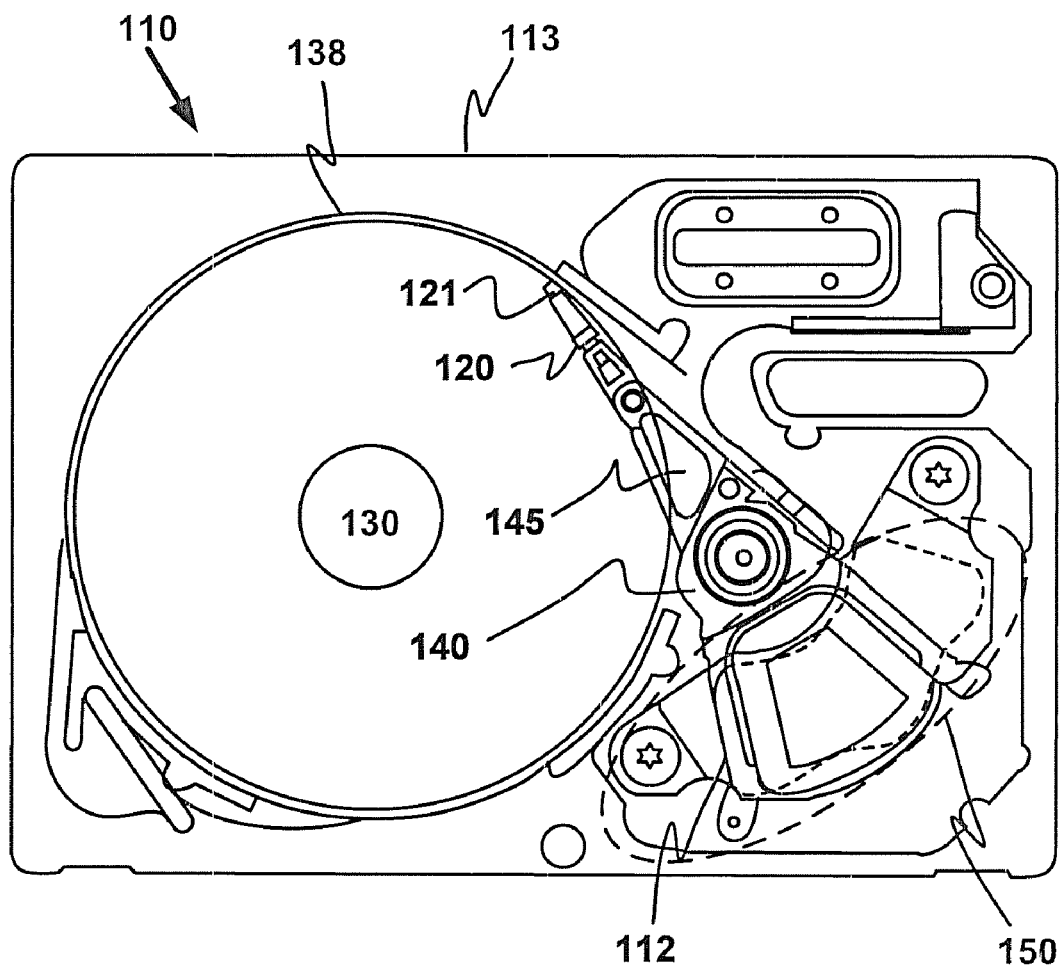
FIG. 1 is a plain view of an HDD in accordance with one embodiment of the present invention.

With reference now to FIG. 1, a schematic drawing of one embodiment of an information storage system including a magnetic hard disk file or HDD 110 for a computer system is shown, although only one head and one disk surface combination are shown. What is described herein for one head-disk combination is also applicable to multiple head-disk combinations. In other words, the present technology is independent of the number of head-disk combinations.

In general, HDD 110 has an outer housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 140 includes one or more actuator arms 145. When a number of actuator arms 145 are present, they are usually represented in the form of a comb that is movably or pivotally mounted to base/housing 113. A controller 150 is also mounted to base 113 for selectively moving the actuator arms 145 relative to the disk 138. Actuator assembly 140 may be coupled with a connector assembly, such as a flex cable to convey data between arm electronics and a host system, such as a computer, wherein HDD 110 resides.

In one embodiment, each actuator arm 145 has extending from it at least one cantilevered integrated lead suspension (ILS) 120. The ILS 120 may be any form of lead suspension that can be used in a data access storage device. The level of integration containing the slider 121, ILS 120, and read/write head is called the head stack assembly.

The ILS 120 has a spring-like quality, which biases or presses the air-bearing surface of slider 121 against disk 138 to cause slider 121 to fly at a precise distance from disk 138. ILS 120 has a hinge area that provides for the spring-like quality, and a flexing cable-type interconnect that supports read and write traces and electrical connections through the hinge area. A voice coil 112, free to move within a conventional voice coil motor magnet assembly is also mounted to actuator arms 145 opposite the head stack assemblies. Movement of the actuator assembly 140 causes the head stack assembly to move along radial arcs across tracks on the surface of disk 138.

Deformable Pogo Pins and Via Holes

Figure 2:
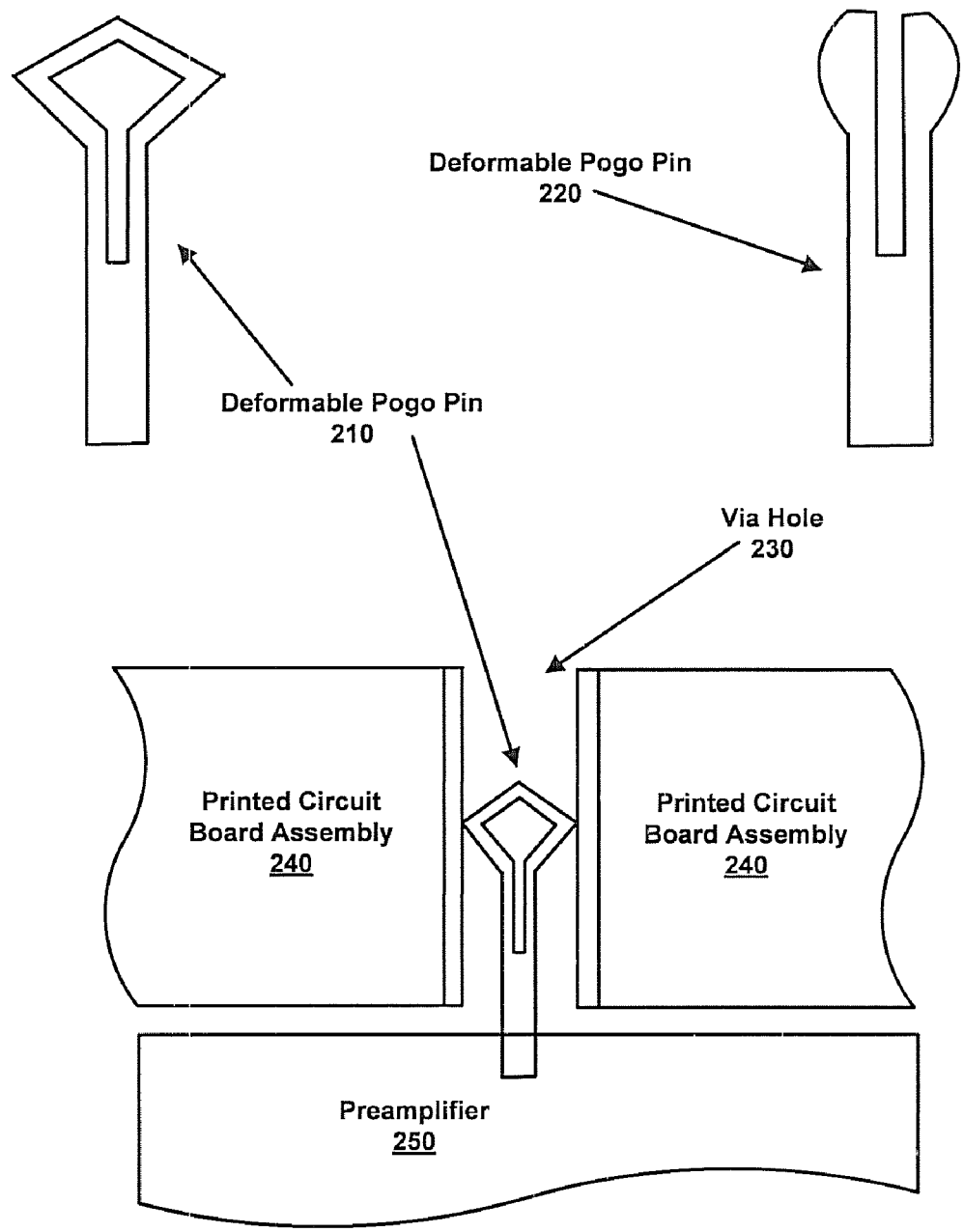
FIG. 2 is a block diagram illustrating deformable pogo pins and a via hole being used to connect the PCBA to the preamplifier in accordance with one embodiment of the present invention.

FIG. 2 is an exemplary diagram of a hard disk 110 using deformable pogo pins (hereinafter "DPP") and via holes to connect the PCBA to the preamplifier. In one embodiment, hard disk 110 is shown to include, in part, DPP 210 which is attached to preamplifier 250 and inserted into vial hole 230 which is part of PCBA 240. DPP 220 is also shown as one alternative of a DPP which can be used in embodiments of the present technology.

In the shown embodiment, hard disk 110 comprises DPP 210 which is shown to have an enlarged tip, the enlarged tip having a sharp edge around the widest diameter, and a portion of the DPP is hollow. It should be appreciated that hollow portion of DPP 210 can be formed in multiple ways. In one embodiment, DPP 210 has a hollow portion which is formed by a hole or a series of holes formed where the axis of the length of such holes or hole is perpendicular to the axis of the length of the DPP. In one embodiment, DPP has a hollow portion formed in such a way that it is contained entirely in the interior of the DPP and cannot be seen from the exterior of the DPP. Alternatively, hard disk 110 may be comprised of DPP similar to DPP 220 which has an enlarged tip, the enlarged tip having rounded edges, and a slot formed starting at the tip and moving part way down the DPP. Forming the DPP with an enlarged tip, as is shown in DPP 210 and 220, ensures that good contact will be made between the DPP and via hole 230. Additionally, an enlarged tip allows pressure to be placed on the DPP in such a way that will allow the DPP to deform as it is inserted into the via hole. Such deformation also ensures that good contact will be made at more than one point for each DPP and via hole.

It should be appreciated that embodiments of the present technology are not limited to DPP 210 and DPP 220. Moreover, aspects of DPP 210 and DPP 220 may be combined in various embodiments. For example, in one embodiment, a DPP can have the rounded edges of DPP 220 and the hollow portion of DPP 210. It should also be appreciated that various embodiments of the present technology use more than one DPP and are not limited to using one type of DPP.

In various embodiments, via hole 230 is formed in PCBA 240. It should be appreciated that via hole 230 and the DPP are formed in such a way that will allow the DPP to be deformed upon insertion into via hole 230. In one embodiment, this is accomplished by forming via hole 230 with a diameter which is smaller than the diameter of the DPP. This ensures that the DPP will deform to match the diameter of via hole 230 upon insertion. In one embodiment, via hole 230 is formed using material that harder is substance than the DPP. The harder substance of the material of via hole 230 will ensure that the DPP is deformed upon insertion. In one embodiment, the via hole deforms instead of the DPP.

In one embodiment, the DPP is inserted into via hole 230 as PCBA 240 is connected to the housing of hard disk 110. In such an embodiment, the DPP does not result in a force which opposes the forces which connect PCBA 240 to the housing of hard disk 110. For example, PCBA 240 is typically connected to the housing of hard disk 110 using screws which apply a force perpendicular to the planar surface of PCBA 240 which force is directly opposed by pogo pins. But in various embodiments of the present technology, the force resulting from the DPP being inserted into the via holes is parallel to the planar surface of PCBA 240. Therefore the stress on PCBA 240 is relieved and the reliability of the HDD is improved.

Moreover, fewer screws can be used to connect PCBA 240 to the housing of hard disk 110 because there is less force resisting the connection; this saves costs in screws and in assembly time.

Zero Insertion Force Connector

Figure 3:
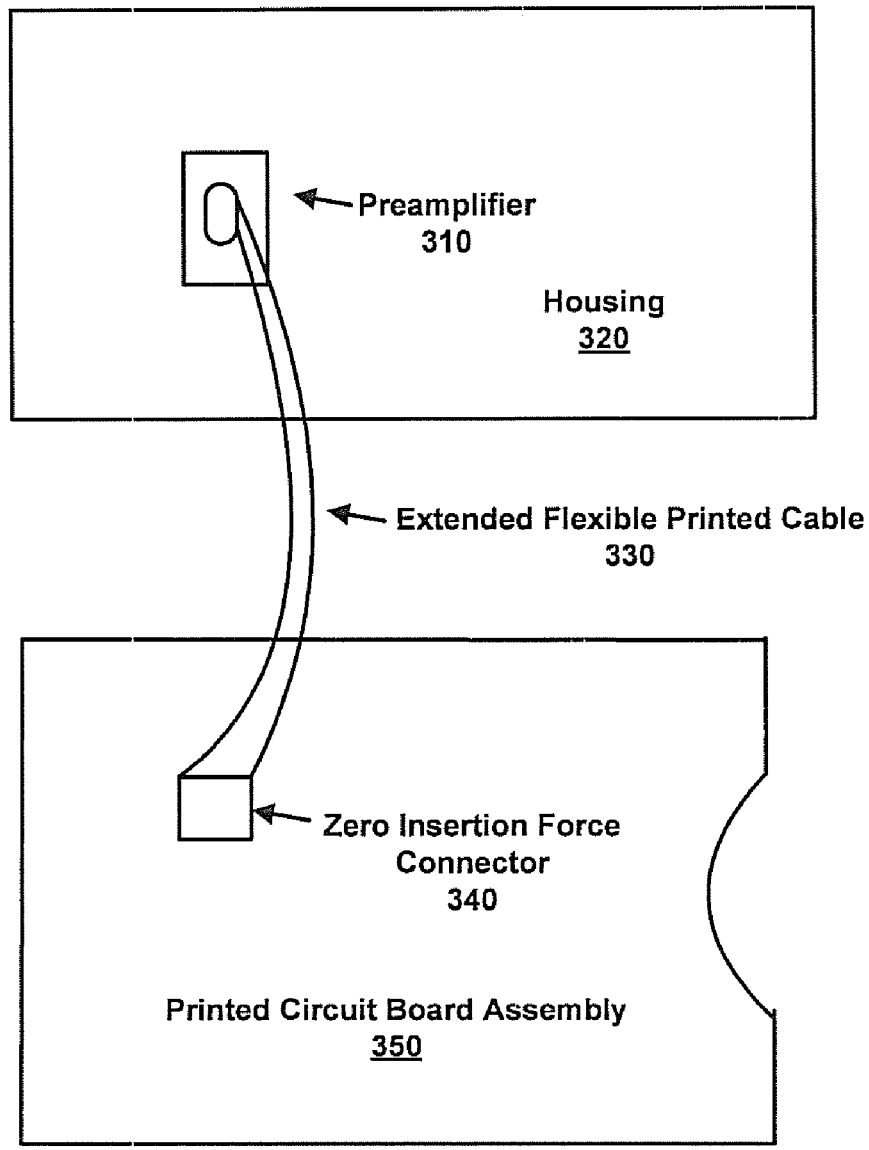
FIG. 3 is a block diagram illustrating a zero insertion force connector and an extended flexible printed cable being used to connect the PCBA to the preamplifier in accordance with one embodiment of the present invention.

FIG. 3 is an exemplary diagram of a hard disk 110 using zero insertion force connector 340 (hereinafter "ZIFC 340") and extended flexible printed cable 330 (hereinafter "EFPC 330") to connect PCBA 350 to preamplifier 310. In one embodiment, hard disk 110 is shown to include, in part, EFPC 330 which is attached to preamplifier 310 and inserted into ZIFC 340 which is part of PCBA 350.

In one embodiment, ZIFC 340 is a zero insertion force connector commonly used in the industry. In one embodiment, ZIFC 340 is connected to EFPC 330. In such an embodiment, the connection does not result in a force that would tend to push PCBA 350 away from preamplifier 310. This avoids stress on PCBA 350 and can be more efficient in assembly.

Figure 4:
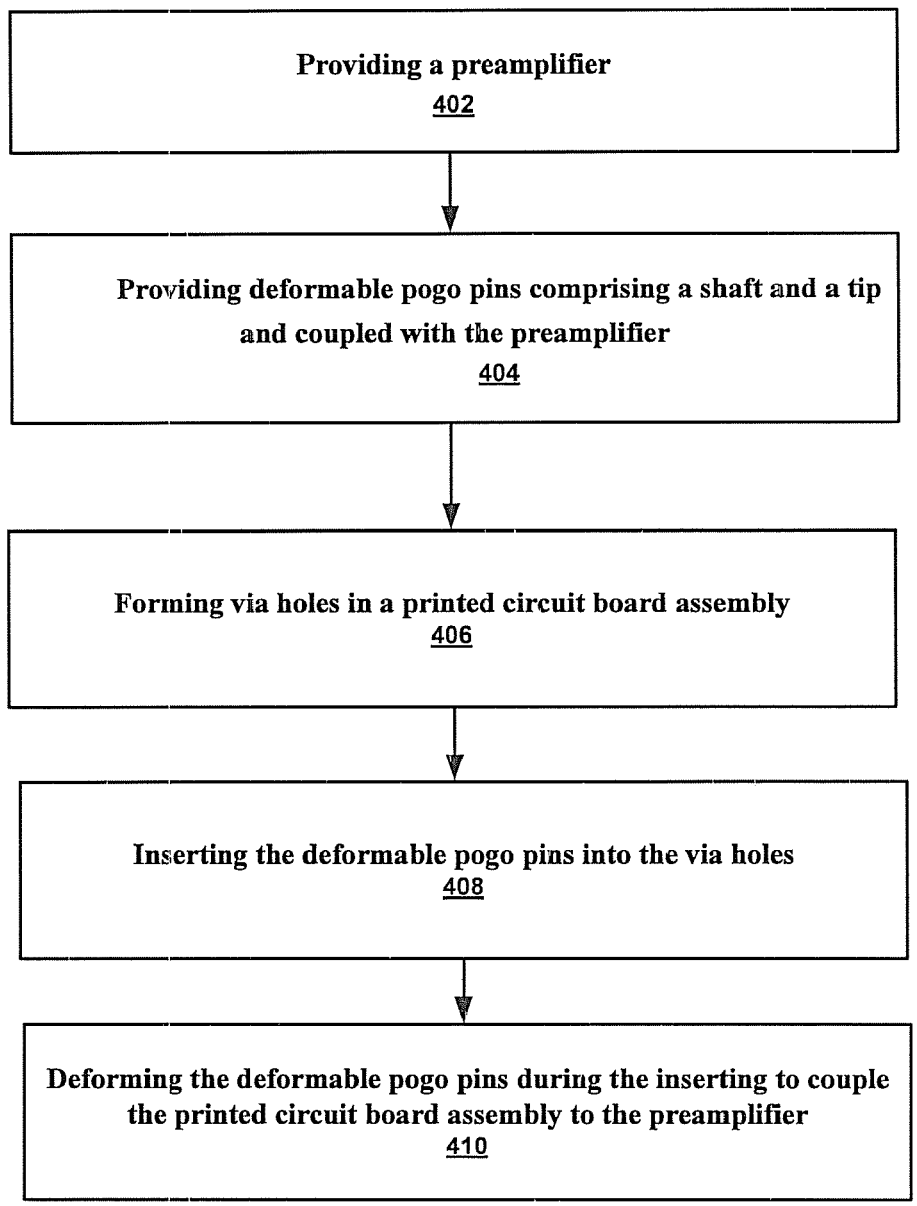
FIG. 4 is a flowchart of a method for assembling a hard disk drive with deformable pogo pins and via holes in accordance with one embodiment of the present invention.

FIG. 4 is a flowchart of a method 400 for assembling a hard disk drive in accordance with one embodiment of the present invention.

At 402, 400 includes providing a preamplifier.

At 404, 400 includes providing deformable pogo pins comprising a shaft and a tip and coupled with the preamplifier.

At 406, 400 includes forming via holes in a printed circuit board assembly.

At 408, 400 includes inserting the deformable pogo pins into the via holes.

At 410, 400 includes deforming the deformable pogo pins during the inserting to couple the printed circuit board assembly to the preamplifier.

Thus, embodiments of the present invention provide a method and apparatus for connecting a preamplifier to a printed circuit board assembly on a hard disk drive.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A disk drive system comprising:
   a housing;
   a head stack assembly coupled with said housing;
   a printed circuit board assembly comprising via holes;
   a preamplifier coupled with said head stack assembly; and
   at least one deformable pogo pin configured to mechanically and communicatively connect said printed circuit board assembly to said preamplifier upon insertion into said via holes, further configured to comprise a tip and a shaft, and further configured to deform upon insertion into said via holes.

2. The disk drive system of claim 1, wherein said via holes are further configured to have a diameter smaller than the diameter of said deformable pogo pin to allow said deformable pogo pins to deform.

3. The disk drive system of claim 1, wherein said via holes are further configured to be composed of a material harder than the material of which said deformable pogo pins are composed of to allow said deformable pogo pins to deform.

4. The disk drive system of claim 1, wherein said deformable pogo pins are further configured to have an open slot starting at the tip of said deformable pogo pin and extending part way down said deformable pogo pin to allow said deformable pogo pins to deform.

5. The disk drive system of claim 1, wherein said deformable pogo pins are further configured so that a portion of said deformable pogo pin is hollow to allow said deformable pogo pins to deform.

6. The disk drive system of claim 1, wherein said deformable pogo pins are further configured so that a diameter of said tips of said deformable pogo pins is wider than said shaft and an outermost diameter forms a sharp edge around a circumference of said deformable pogo pins to allow said deformable pogo pins to deform.

7. The disk drive system of claim 1, wherein said deformable pogo pins are further configured so that a diameter of said tips of said deformable pogo pins is wider than said shaft and an outermost diameter forms a rounded edge around a circumference of said deformable pogo pins to allow said deformable pogo pins to deform.

8. The disk drive system of claim 1, wherein said deformable pogo pins are further configured in a way that a force resulting from said deformable pogo pins deforming upon said insertion into said via holes does not force said printed circuit board assembly away from said preamplifier.

9. A method for assembling a hard disk drive comprising:
providing a preamplifier;
providing deformable pogo pins comprising a shaft and a tip and coupled with said preamplifier;
forming via holes in a printed circuit board assembly;
inserting said deformable pogo pins into said via holes; and
deforming said deformable pogo pins during said inserting to couple said printed circuit board assembly to said preamplifier.

10. The method of claim 9, wherein a force exerted on said printed circuit board assembly resulting from said deforming said deformable pogo pins is parallel to the planar surface of said printed circuit board assembly.

11. The method of claim 9, wherein said forming via holes further comprises:
forming said via holes with a diameter smaller than the diameter of said deformable pogo pin to enable said deforming.

12. The method of claim 9, wherein said forming via holes further comprises:
forming said via holes with a material harder than the material of which said deformable pogo pins are composed to enable said deforming.

13. The method of claim 9 wherein said forming deformable pogo pins further comprises:
forming said deformable pogo pins with an open slot starting at the tip of said deformable pogo pin and extending part way down said deformable pogo pin to enable said deforming.

14. The method of claim 9 wherein said forming deformable pogo pins further comprises:
forming said deformable pogo pins so that a portion of said deformable pogo pin is hollow to enable said deforming.

15. The method of claim 9 wherein said forming deformable pogo pins further comprises:
forming said deformable pogo pins so that a diameter of said tips of said deformable pogo pins is wider than said shaft and an outermost diameter forms a sharp edge around a circumference of said deformable pogo pins; and
wherein said inserting said deformable pogo pins into said via holes further comprises said sharp edge contacting said via holes.

16. The method of claim 9 wherein said forming deformable pogo pins further comprises:
forming said deformable pogo pins so a the diameter of said tips of said deformable pogo pins is wider than said shaft and an outermost diameter forms a rounded edge around a circumference of said deformable pogo pins; and
wherein said inserting said deformable pogo pins into said via holes further comprises said rounded edge contacting said via holes.

* * * * *

UNITED STATES PATENT AND TRADEMARK OFFICE
CERTIFICATE OF CORRECTION

PATENT NO.          : 8,098,459 B2                                   Page 1 of 1
APPLICATION NO.     : 12/324813
DATED               : January 17, 2012
INVENTOR(S)         : Yeow Yong Chan et al.

It is certified that error appears in the above-identified patent and that said Letters Patent is hereby corrected as shown below:

On the title page under item (56) FOREIGN PATENT DOCUMENTS, Delete: "EP 0710955 5/1999"

Insert: --EP 0710955 5/1996--

OTHER PUBLICATIONS, Delete: "Jawaid, Shams et al., "Design Evaluation & Product Reliability Assessment Using Accelerated Reliability Fatigue Life Tests", Reliability abd Maintainability Symposium http://ieeexplore.ieee.org/appliation/mdl/mdlconfirmation.jsp?arnumber=816314, (2000),239-244."

Insert: --Jawaid, Shams et al., "Design Evaluation & Product Reliability Assessment Using Accelerated Reliability Fatigue Life Tests", Reliability abd Maintainability Symposium http://ieeexplore.ieee.org/application/mdl/mdlconfirmation.jsp?arnumber=816314, (2000),239-244.--

Signed and Sealed this
Twelfth Day of June, 2012

David J. Kappos
*Director of the United States Patent and Trademark Office*

UNITED STATES PATENT AND TRADEMARK OFFICE
CERTIFICATE OF CORRECTION

PATENT NO.        : 8,098,459 B2
APPLICATION NO.   : 12/324813
DATED             : January 17, 2012
INVENTOR(S)       : Yeow Yong Chan et al.

Page 1 of 1

It is certified that error appears in the above-identified patent and that said Letters Patent is hereby corrected as shown below:

On the title page under item (56) OTHER PUBLICATIONS, Delete: "Jawaid, Shams et al., "Design Evaluation & Product Reliability Assessment Using Accelerated Reliability Fatigue Life Tests", Reliability abd Maintainability Symposium http://ieeexplore.ieee.org/application/mdl/mdlconfirmation.jsp?arnumber=816314, (2000),239-244."

Insert: --Jawaid, Shams et al., "Design Evaluation & Product Reliability Assessment Using Accelerated Reliability Fatigue Life Tests", Reliability and Maintainability Symposium http://ieeexplore.ieee.org/application/mdl/mdlconfirmation.jsp?arnumber=816314, (2000),239-244.--

Signed and Sealed this
Twenty-fifth Day of September, 2012

David J. Kappos
*Director of the United States Patent and Trademark Office*